United States Patent
Tamura

(10) Patent No.: US 9,029,449 B2
(45) Date of Patent: *May 12, 2015

(54) POLYMERIC COMPOSITION COMPRISING METAL ALKOXIDE CONDENSATION PRODUCT, ORGANIC SILANE COMPOUND AND BORON COMPOUND

(75) Inventor: Shinichi Tamura, Fukushima (JP)

(73) Assignee: Nitto Boseki Co., Ltd., Fukushima-Shi (JP)

( * ) Notice: Subject to any disclaimer, the term of this patent is extended or adjusted under 35 U.S.C. 154(b) by 1017 days.

This patent is subject to a terminal disclaimer.

(21) Appl. No.: 12/440,669

(22) PCT Filed: Oct. 1, 2007

(86) PCT No.: PCT/JP2007/069179
§ 371 (c)(1),
(2), (4) Date: Mar. 10, 2009

(87) PCT Pub. No.: WO2008/044521
PCT Pub. Date: Apr. 17, 2008

(65) Prior Publication Data
US 2009/0252970 A1 Oct. 8, 2009

(30) Foreign Application Priority Data
Oct. 13, 2006 (JP) .................. 2006-279352

(51) Int. Cl.
| | | |
|---|---|---|
| C08K 5/24 | (2006.01) | |
| C08G 77/56 | (2006.01) | |
| C08G 77/18 | (2006.01) | |
| C08G 77/388 | (2006.01) | |
| C08G 77/58 | (2006.01) | |
| C08K 3/38 | (2006.01) | |
| C08L 83/14 | (2006.01) | |
| C08L 85/04 | (2006.01) | |
| C09D 183/14 | (2006.01) | |
| C09D 185/04 | (2006.01) | |
| C09J 183/06 | (2006.01) | |
| C09J 183/14 | (2006.01) | |
| C09J 185/04 | (2006.01) | |
| C08L 63/00 | (2006.01) | |

(52) U.S. Cl.
CPC .............. *C08G 77/56* (2013.01); *C08G 77/18* (2013.01); *C08G 77/388* (2013.01); *C08G 77/58* (2013.01); *C08K 3/38* (2013.01); *C08L 63/00* (2013.01); *C08L 83/14* (2013.01); *C08L 85/04* (2013.01); *C09D 183/14* (2013.01); *C09D 185/04* (2013.01); *C09J 183/06* (2013.01); *C09J 183/14* (2013.01); *C09J 185/04* (2013.01)

(58) Field of Classification Search
CPC ......... C08L 43/04; C08L 83/06; C08L 85/00; C08L 83/08; C08K 5/04
USPC ............ 524/261, 398, 588; 528/394; 525/474
See application file for complete search history.

(56) References Cited

U.S. PATENT DOCUMENTS

| | | | |
|---|---|---|---|
| 2,972,598 A | 2/1961 | Morehouse | |
| 3,018,299 A | 1/1962 | Pike | |
| 3,379,607 A | 4/1968 | Foster | |
| 4,152,509 A | 5/1979 | Yajima | |
| 5,698,628 A | 12/1997 | Masuda et al. ................ | 524/806 |
| 5,865,926 A * | 2/1999 | Wu et al. ........................ | 156/229 |
| 6,955,771 B2 * | 10/2005 | Ryang ...................... | 252/389.31 |
| 7,709,597 B2 * | 5/2010 | Tamura ........................ | 528/394 |
| 2002/0102417 A1 | 8/2002 | Schutt | |
| 2007/0167554 A1 | 7/2007 | Ryang | |

FOREIGN PATENT DOCUMENTS

| | | |
|---|---|---|
| EP | 1887025 A1 | 2/2008 |
| JP | 53-42300 | 4/1978 |
| JP | 60-156770 | 8/1985 |
| JP | 64-69634 | 3/1989 |
| JP | 10-152561 | 6/1998 |
| JP | 2001-335700 A1 | 12/2001 |
| JP | 2002-128898 A1 | 5/2002 |
| JP | 2002-179800 A1 | 6/2002 |
| JP | 2002-265609 A1 | 9/2002 |
| JP | 2003-253123 A1 | 9/2003 |
| JP | 2003-531924 A1 | 10/2003 |
| WO | WO 2006/129695 A1 | 12/2006 |
| WO | WO 2007/021965 A2 | 2/2007 |
| WO | WO 2007/102020 A1 | 9/2007 |

OTHER PUBLICATIONS

Machine Translation of JP 2002-128898.* International Search Report for International Application No. PCT/JP2007/069179 dated Oct. 24, 2007.
Supplementary European Search Report dated May 20, 2010.

* cited by examiner

*Primary Examiner* — Hannah Pak
(74) *Attorney, Agent, or Firm* — Kratz, Quintos & Hanson, LLP

(57) ABSTRACT

A polymeric composition comprising: a reaction product (c) produced by reacting an organic silane compound (a) represented by the formula: $R_{4-n}$—Si—$(OR')_n$ [wherein R represents an organic group containing an amino group; R' represents a methyl group, an ethyl group or a propyl group; and n represents an integer selected from 1 to 3] with at least one boron compound (b) selected from the group consisting of $H_3BO_3$ and $B_2O_3$; and a condensation product (d) of a metal alkoxide.

15 Claims, No Drawings

POLYMERIC COMPOSITION COMPRISING METAL ALKOXIDE CONDENSATION PRODUCT, ORGANIC SILANE COMPOUND AND BORON COMPOUND

TECHNICAL FIELD

The present invention relates to a polymeric composition comprising a condensation product of a metal alkoxide and a reaction product obtained by reacting an organosilane compound with a boron compound; and a coating agent, an adhesive, a glass base material and a functional material using such a polymeric composition.

BACKGROUND ART

The coating agents containing a metal alkoxide such as tetraethoxysilane (TEOS) and an aminosilane compound have been known from long ago. Such coating agents, however, were poor in film forming properties and had difficulties in making a film. Also, the film strength (hardness) provided by use of such coating agents would prove unsatisfactory for certain applications.

For instance, Patent Document 1 describes a coating resin composition comprising a metal alkoxide such as tetraethoxysialne (TEOS) or its condensate and an aminosilane compound. Although use of such a metal alkoxide condensation product could provide an improvement of film forming properties, there still was room for improvement of hardness of the obtained film. Patent Document 1: JP-A-8-295826

DISCLOSURE OF THE INVENTION

Problem to be Solved by the Invention

As a result of concentrated studies on the subject matter, the present inventor found that addition of boric acid to a coating agent containing a metal alkoxide and an aminosilane compound could provide an improvement of film forming properties. It was further found that in case of using a metal alkoxide as a monomer, the film forming properties are deteriorated if the monomer is added in an excess amount, but in case of using a condensation product of a metal alkoxide, there takes place little reduction of the formed film hardness even if the condensation product is added in a large amount.

The present invention provides a polymeric composition serviceable as a base material for a coating agent having excellent film forming properties and capable of providing satisfactory hardness (toughness) to the produced film; a coating agent and an adhesive containing such a polymeric composition as a main component; and a base material, a glass base material and a functional material using the above polymeric composition.

Means for Solving the Problem

The present invention has solved the above problem, and it provides:
a polymeric composition comprising:
a reaction product (c) obtained by reacting (b) an organosilane compound represented by the following formula:

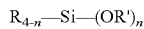

(wherein R represents an organic group containing an amino group; R' represents a methyl group, an ethyl group or a propyl group; and n is an integer selected from 1 to 3) with (c) at least one boron compound selected from the group consisting of $H_3BO_3$ and $B_2O_3$; and
(d) a condensation product of a metal alkoxide represented by at least one formula selected from the group consisting of the following formulae (d1) and (d2):

[Formula 1]

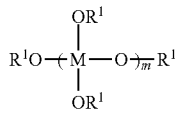

(d1)

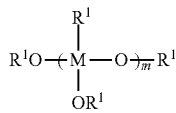

(d2)

(wherein $R^1$ represents independently an alkyl group, part of which may be hydrogen, and $R^1$ may be identical to or different from each other; m is an integer selected from 2 to 20; and M represents at least one metal selected from the group consisting of Si, Ti and Zr.)

The present invention also relates to a polymeric composition comprising the above-described polymeric composition and a synthetic resin.

The present invention further relates to the above-described polymeric composition which is fibrous or granular in shape. The present invention also relates to a coating agent or an adhesive containing the above-described polymeric composition as a main component. The present invention further relates to a functional material obtained by coating an inorganic or organic base material with the above-described polymeric composition, coating agent or adhesive. The present invention also pertains to a glass base material obtained from the above-described polymeric composition or functional material.

The present invention additionally relates to a base material or a glass base material obtained by calcining the above-described fibrous or granular polymeric composition or functional material at a temperature 1,000° C. or below.

Advantages of the Invention

The polymeric material and the polymeric composition obtained according to the present invention can be applied to the ceramic and glass products as a coating agent or an adhesive having excellent film forming properties and a sufficient hardness.

The above composition can also be used as a resin hard coating agent by adding a synthetic resin.

BEST MODE FOR CARRYING OUT THE INVENTION

Detailed Description

When the component (a) (an organosilane compound) and the component (b) (a boron compound) are mixed with each other, they are reacted form a limpid and viscous liquid and the liquid is solidified in several minutes to several ten minutes. This can be accounted for as follows: the boron compound functions as a crosslinking agent through the medium of the amino group in the component (a) to cause a polymerization of these components, resulting in forming a viscous liquid and its solidification. The component (a) is liquid. In the present invention, no water is used in reacting the component (a) and the component (b).

The component (a) is a silane compound containing an amino group, which is represented by the following formula:

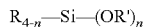

$$R_{4-n}-Si-(OR')_n$$

(wherein R represents an organic group containing an amino group; R' represents a methyl group, an ethyl group or a propyl group; and n is an integer selected from 1 to 3.)

Here, R represents an organic group containing an amino group, the examples thereof including, but not limited to, monoaminomethyl, diaminomethyl, triaminomethyl, monoaminoethyl, diaminoethyl, triaminoethyl, tetraminoethyl, monoaminopropyl, diaminopropyl, triaminopropyl, tetraminopropyl, monoaminobutyl, diaminobutyl, triaminobutyl, tetraminobutyl, and organic groups having an alkyl or aryl group with a greater number of carbon atoms than those mentioned above. Of these organic groups, γ-aminopropyl, aminoethyl and aminopropyl are especially preferred, with γ-aminopropyl being the most preferred.

R' in the formula of the component (a) represents a methyl group, an ethyl group or a propyl group, of which methyl and ethyl groups are preferred.

Letter n in the formula of the component (a) is an integer selected from 1 to 3, preferably 2 or 3, most preferably 3.

Thus, γ-aminopropyltriethoxysilane and N-β-(aminoethyl)-γ-aminopropyltrimethoxysilane are particularly preferred as the component (a).

The component (b) is at least one boron compound selected from the group consisting of $H_3BO_3$ and $B_2O_3$. The component (b) is preferably $H_3BO_3$.

The amounts of both components (a) and (b) used in their reaction can be decided arbitrarily, but preferably they are adjusted so that the amount of the component (b) will be 0.02 mol or larger, more preferably 0.02 to 8 mol, even more preferably 0.02 to 5 mol, still more preferably 0.2 to 5 mol, per mol of the component (a).

When the amount of the component (b) is less than 0.02 mol per mol of the component (a), the time required for solidification may prolong or the mixture may not be sufficiently solidified. When the amount of the component (b) exceeds 8 mol, the component (b) may remain undissolved in the component (a).

The mixing conditions (temperature, mixing time, mixing method, etc.) of the components (a) and (b) of the polymeric composition of the present invention can be properly selected. Under ordinary conditions of room temperature, the mixture becomes a limpid and viscous liquid and is solidified in several minutes to several ten minutes. The time required for the solidification and the viscosity and rigidity of the obtained reaction product (c) differ depending on the ratio of the boron compound used in the reaction.

The boron compound (b) is preferably offered as an alcohol solution prepared by dissolving a boron compound in an alcohol with a carbon number of 1 to 7. Examples of the alcohols with a carbon number of 1 to 7 include methyl alcohol, ethyl alcohol, various kinds of propyl alcohol, various kinds of butyl alcohol and glycerin, of which methyl alcohol, ethyl alcohol and isopropyl alcohol are preferred. Use of such an alcohol solution can shorten the time required for dissolving the component (b) in the component (a). The higher the concentration of the boron compound in the alcohol, the more preferable for handling of the solution.

The above reaction product is preferably a reaction product obtained by reacting the component (a) with the component (b) without going through a step of hydrolysis using water.

The polymeric composition of the present invention contains, in addition to the reaction product (c) obtained by reacting the component (a) with the component (b) as described above, a condensation product (d) of a metal alkoxide represented by at least one of the following formulae (d1) and (d2):

[Formula 2]

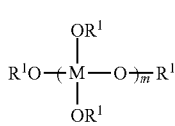

(d1)

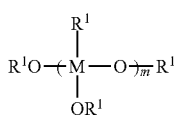

(d2)

(wherein $R^1$ represents independently an alkyl group, part of which may be hydrogen, and $R^1$ may be identical to or different from each other; m is an integer selected from 2 to 20; and M represents at least one metal selected from the group consisting of Si, Ti and Zr).

The component (d) is added in the course of or after the reaction between the components (a) and (b). Addition of the component (d) is helpful for enhancing hardness of the product while improving its electrical and chemical properties. Also, since the composition is made into a viscous liquid by the addition of component (d), it can be worked into fibers or films.

The amount of the metal alkoxide condensation product, or component (d), added is preferably 2 to 50 mol, more preferably 4 mol or more, calculated in terms of weight of the metal alkoxide monomer, per mol of the component (a). When the amount of the component (d) is too large, hardness of the product tends to lower. On the other hand, when the amount of the component (d) is too small, there may take place a reduction of hardness and/or the problem of chemical durability of the product due to the low Si content.

$R^1$ in the formula of the component (d) represents independently an alkyl group, part of which may be hydrogen, and $R^1$ may be identical to or different from each other. Specifically, $R^1$ is a methyl group, an ethyl group, a propyl group, a butyl group or other alkyl groups with a carbon number equal to or greater than these groups, of which methyl group and ethyl group are preferred.

m in the formula of the component (d) is an integer selected from 2 to 20, preferably 3 to 10, most preferably 5.

M in the formula of the component (d) represents at least one metal selected from the group consisting of Si, Ti and Zr, of which Si and Ti are preferred, with Si being the most preferred.

As the metal alkoxide monomeric units composing the component (d), there can be exemplified tetramethoxysilane, tetraethoxysilane, tetrapropoxysilane, tetrabutoxysilane, methyltrimethoxysilane, ethyltriethoxysilane, propyltripropoxysilane, butyltributoxysilane, tetramethoxytitanium, tetraethoxytitanium, tetrapropoxytitanium, tetrabutoxytitanium, methyltrimethoxytitanium, ethyltriethoxytitanium, propyltriproxytitanium, butyltributoxytitanium, tetramethoxyzirconium, tetraethoxyzirconium, tetrapropoxyzirconium, tetrabutoxyzirconium, methyltrimethoxyzirconium, ethyltriethoxyzirconium, propyltripropoxyzirconium and butyltributoxyzirconium.

In the case when the component (d) is represented by the above-shown formula (d1), it is preferably a condensation product (pentamer) of tetraethoxysilane or a condensation product (pentamer) of tetramethoxysilane. In the case when the component (d) is represented by the above-shown formula (d2), it is preferably a condensation product (pentomer) of ethyltriethoxysilane or a condensation product (pentomer) of methyltrimethoxysilane.

The polymeric composition of the present invention may contain a metal alkoxide monomer in addition to the component (d). Since the metal alkoxide monomer is low in viscosity in comparison with the condensation product of component (d), incorporation of a metal alkoxide monomer has an advantage of enhancing adhesion of the obtained polymeric composition to the base material, but it is to be noted that if the content of metal alkoxide monomer is increased, for instance, to such a level as being equal to or higher than the content of the component (d), the film forming properties may be deteriorated when the coating film is made thick.

The amount of the metal alkoxide monomer used is preferably 10 mol or less, more preferably 0.1 to 5 mol, per mol of the component (a). When the amount of the metal alkoxide monomer is less than 0.1 mol, it may prove difficult to obtain the aimed effect of addition thereof. When the amount of the metal alkoxide monomer exceeds 5 mol, the obtained composition may become cloudy.

Examples of the metal in the metal alkoxide monomer include, though not limited to, Si, Ta, Nb, Ti, Zr, Al, Ge, B, Na, Ga, Ce, V, Ta, P and Sb. Si, Ti and Zr are preferred, with Si and Ti being especially preferred as this component is preferably liquid. Exemplary of the alkoxide (alkoxyl group) in the metal alkoxide monomer are methoxy, ethoxy, propoxy, butoxy and other alkoxyl groups having a greater number of carbon atoms than those mentioned above. Of these alkoxyl groups, methoxy, ethoxy, propoxy and butoxy are preferred, with methoxy and ethoxy being especially preferred. The more preferred metal alkoxide monomers are those same as the monomer unit of the component (d), of which tetraethoxysilane, tetramethoxysilane, ethyltriethoxysilane and methyltrimethoxysilane are even more preferred.

The polymeric composition of the present invention may further contain a synthetic resin and/or a diol-based compound (component (e)). The component (e) may be added, in addition to the component (d), during or after the reaction between the components (a) and (b). Addition of the component (e) provides a crack resistance to the obtained reaction product and enables use of the polymeric composition for resin hard coating agent.

The synthetic resins usable as the component (e) are not specifically defined in the present invention, and there can be used, for instance, thermosetting resins, thermoplastic resins and ultraviolet-curing resins. More specifically, it is possible to use the synthetic resins ranging widely in polymerization degree (molecular weight), which include, for instance, acrylic resins, epoxy resins, polyester resins, amino resins, urethane resins, furan resins, silicone resins, and the modified versions of these resins. Of these synthetic resins, epoxy resins, dipentaerythritol hexaacrylate, epoxy acrylate, silicone resins, vinyl ester resins, polyvinyl butyral, polyvinyl alcohol and the like are preferred.

The diol-based compounds usable as the component (e) are also not specified in the present invention; it is possible to use, for instance, polycaptolactonediol, 1,6-hexanediol, polycarbonatediol and polyesterdiol, of which polyesterdiol is particularly preferred.

The amount of the component (e) used is preferably 50% by weight or less, more preferably 1 to 40% by weight, based on the overall amount of the composition. If the component (e) is less than 1% by weight, it may become hard to obtain the effect of addition of the component (e) as mentioned above. If the component (e) exceeds 40% by weight, it may become necessary to add a resin curing agent, and there may not be obtained a high hardness.

When the component (e) is contained in the polymeric composition of the present invention, it is preferable to suppress the content of the metal alkoxide condensation product which is the component (d). When the component (e) is contained and the content of the component (d) is high, the curing time necessary for obtaining the polymeric composition of the present invention tends to prolong, giving rise to the problem of elongated humidity curing time. In this case, specifically, the amount of the component (d) to be added is preferably 2 to 20 mol, as calculated in terms of weight of the metal alkoxide monomer, per mol of the component (a).

By forming into fibers the polymeric composition of the present invention, it is possible to obtain a nonwoven fabric with an excellent heat resistance and chemical resistance. Methods such as melt spinning, centrifugation and electrospinning can be employed for forming fibers.

By granulating the polymeric composition of the present invention, it can be utilized as an inorganic filler. Granulation can be effected by, for instance, a method in which the polymeric composition is made into a spherical form and solidified by spraying or a method in which a thin film is formed by spin coating and crashed.

A base material obtained by calcining the fibrous or granular polymeric composition of the present invention at a temperature of 1,000° C. or below can be raised in density by calcination and can be utilized as an inorganic filler. Especially, by calcining the polymeric composition in a granular form, it is possible to raise the Si content.

The polymeric composition of the present invention may contain, besides the above-mentioned components, the necessary substances such as colorant, mildewcide, photocatalytic material, antirust, anticorrosive, algae control agent, water repellant, conductive material, heat ray absorber, heat ray reflective material and the like according to the purpose of use of the composition.

It is possible to obtain a coating agent or an adhesive by containing the polymeric composition of the present invention as a main component in a base material.

Functional materials can be obtained by coating the inorganic or organic base materials with the polymeric composition of the present invention, a coating agent or an adhesive. A variety of materials such as wood, stone, plastic and textile goods can be used as the inorganic or organic base materials. By thus coating the inorganic or organic base materials with the polymeric composition of the present invention, it is possible to produce an antistatic effect, an oxygen and water vapor barrier effect and a blemish sealing effect. Particularly, by applying the polymeric composition of the present invention on a cloth such as glass cloth while it is still in a state of liquid or syrup, there can be easily obtained a filled-up cloth or heat-resistant cloth. The polymeric composition of the present invention can be applied to coating even if its viscosity is 1 poise or less, so that by having the polymeric composition impregnated in a base material, it is possible to modify the quality of the base material while keeping its intrinsic properties intact.

Further, a binder made by containing a photocatalyst in the polymeric composition of the present invention is less liable to decompose with time than ordinary organic binders. Also, by coating a base material with the polymeric composition of the present invention, the surface of the base material is provided with heat resistance and electrical insulation.

Moreover, by adding an inorganic powder such as alumina, silica or glass powder, it is possible to obtain a high-grade inorganic adhesive which is applicable even under high temperatures 1,000° C. or more and shows high adhesive force even at normal temperature. Similarly, by adding a metal powder or metal ion, there can be obtained a conductive coating or conductive adhesive. When it is desired to color the preparation, a metal ion, organic colorant or organic fluorescent agent can be added. This can greatly lessen a discoloration of the organic fluorescent agents. Also, an inorganic or organic antibacterial agent or mildewproofing agent can be added for utilizing the preparation as a sanitary material.

Still further, a glass base material having an inorganic coating film can be obtained by calcining at 1,000° C. or below a functional material obtained by coating a base material such as a glass fiber cloth or glass cloth with the polymeric composition of the present invention.

The coating agent provided according to the present invention is useful for hard coating of photodisplay materials and devices. For instance, it is useful for hard coating of the liquid crystal devices (such as AG AR film, TAC film, polarizing film, separate film, transparent electrode, color filter, orienting film, phase difference film, plasma sheet, diffuser, photoconductive plate, reflector and the like) and for hard coating of PC and PP coats in the plasma display systems.

The polymeric composition of the present invention can be also used as an adhesive for photocatalysts as it has a skeleton of an inorganic material (Si), and such an adhesive has less tendency to decompose and deteriorate than the adhesives made of an organic material (having a carbon skeleton).

The polymeric composition of the present invention can further contain a near infrared intercepting material (component (c1)). Conductive metal oxides and/or near infrared absorbing pigments may be cited as examples of such a near infrared intercepting material. Addition of the component (c1) makes it possible for the composition to cut off near infrared rays.

The conductive metal oxides usable as the component (c1) are not subject to specific restrictions; it is possible to use, for instance, oxides of at least one metal selected from Au, Ag, Ni, Cu, In, Sn and Sb, preferably at least one oxide selected from the group consisting of ITO (indiumtin oxide) and ATO (antimonytin oxide).

For a material which is transparent to light, it is essential that such a material shows no reflection and absorption of visible light and is also capable of suppressing scatter of light. Therefore, in order to minimize scatter of light, it is preferable that the material is composed of the ultrafine particles of a size which is ½ of the light wavelength, that is, 200 nm or less on the average.

Transparency of a film obtained from a coating composition is judged by haze (ratio of the scattered light component to the whole transmitted light) of the film. The film gives a sense of cloudiness when its haze exceeds 2%, so that it is preferable to suppress haze to 2% or less for providing transparency to the film. In case of using the ultrafine particles of ITO or ATO with a refractive index of around 2 for attaining a haze of 2% or less, it is preferable to use the particles dispersed to have an average size of 100 nm or less. It should be noted, however, that if the average particle size is made too small, although transparency is increased, the capability of the film to intercept near infrared rays may be reduced, so that in order to obtain a near infrared ray intercepting ability above a certain level, it is undesirable to disperse the ultrafine particles to such an extent that they will have an average particle size of 10 nm or less. It is, therefore, preferable to control the average particle size to stay within an appropriate range in view of the balance between transparency and near infrared ray intercepting ability.

The amount of the conductive metal oxide of component (c1) used has no specific limitations, but it is preferably 0.5 to 50 parts by weight, more preferably 1 to 20 parts by weight, even more preferably 2 to 10 parts by weight, per 100 parts by weight of the polymeric composition including the reaction product obtained by reacting the component (a) with the component (b).

The near infrared absorbing pigment used as component (c1) is not subject to any specific restrictions as far as it has a near infrared absorbability. There can be used, for instance, at least one near infrared absorbing pigment selected from the azo-based, aluminum-based, anthraquinone-based, cyanine-based, diimonium-based, diol-metal complex-based, nosquarilium-based and phtharocyanine-based near infrared absorbing pigments. Of these near infrared absorbing pigments, the diimonium-based and phtharocyanine-based pigments are preferred. Typical examples of such near infrared absorbing pigments are [bis(4-t-butyl-1,2-dithiophenolate) copper-tetra-n-butylammonium] (BBT produced by Sumitomo Fine Chemical Co., Ltd.), 1,1,5,5-tetrakis[4-(diethylamino)phenyl]-1,4-pentadiene-3-illium-P-toluenesulfonate (Karenz IR-T produced by Showa Denko KK), and a phtharocyanine compound (TKR-2040 produced by Yamamoto Chemical Industries Co., Ltd.).

In case when the near infrared absorbing pigment of component (c1) is a pigment which is soluble in the solvents such as lower alcohols or ethers, the pigment may be incorporated in the coating composition of the present invention in a form of a solution prepared by dissolving the pigment in such a solvent. In the case of a pigment which is insoluble in such solvents, the pigment may be incorporated in the coating composition in the form as it is, such as in the form of granules. When a near infrared absorbing pigment of component (c1) is contained in such a granular form, it is preferable to use the granules having the same average size as the conductive metal oxide of component (c1).

The amount of the near infrared absorbing pigment used as component (c1) is not specifically defined, but in case where the pigment is used in a form of a solution, the amount thereof is preferably 0.01 part by weight or above, more preferably 0.1 to 50 parts by weight, even more preferably 0.2 to 25 parts by weight, especially 0.5 to 15 parts by weight, per 100 parts by weight of the polymeric composition containing the reaction product obtained by reacting the component (a) with the component (b). In case where the near infrared absorbing pigment of component (c1) is used in a solid form such as granules, its amount used is preferably 0.1 to 50 parts by weight, more preferably 0.5 to 25 parts by weight, even more preferably 1 to 15 parts by weight, per 100 parts by weight of the polymeric composition containing the reaction product obtained by reacting the component (a) with the component (b).

It is possible to use both of a conductive metal oxide and a near infrared absorbing pigment in combination as component (c1).

The polymeric composition of the present invention which contains component (c1) can be produced without necessitating complicate steps such as hydrolysis, which is essential in a sol-gel method, and without requiring a long time for the procedure. It is also possible to produce a near infrared interceptive coating composition having high weather resistance, excellent optical properties (such as transparency) and hard coating ability. The obtained coating composition can be applied to glass, ceramic and transparent plastic products.

The polymeric composition of the present invention may further contain an antirust function imparting agent (rust preventive agent) (component (c2) and/or component (c3)) in place of or in addition to the above-described component (c1).

The polymeric composition of the present invention is provided with an antirust function by the incorporation of an antirust function imparting agent (rust preventive agent).

The composition may further contain, as component (c2), at least one compound selected from the group consisting of imidazole-based nitrogen heterocyclic compounds, triazole-based nitrogen heterocyclic compounds, tetrazole-based nitrogen heterocyclic compounds, pyrazole-based nitrogen heterocyclic compounds, and the salts of these compounds.

As component (c2), the following compounds can be cited as examples: 2-methyl-4,5-dibenzylimidazole, 2-methyl-4-(4-chlorophenylmethyl)imidazole, 2-phenyl-4-(4-methylphenylmethyl)imidazole, 3-hydroxy-1,2,4-triazole, 3-mercapto-1,2,4-triazole, 3-amino-1,2,4-triazole, 3,5-pyrazole, 3-methyl-5-hydroxypyrazole, 4-aminopyrazole, 5-phenyl-1,2,3,4-tetrazole, 1-(3-aminophenyl)-1,2,3,4-tetrazole, 1-(4-hydroxyphenyl)-1,2,3,4-tetrazole, and the salts of these compounds. These compounds and salts may be used singly or in the form of a mixture of any two or more thereof.

3-amino-1,2,4-triazole and 2-phenyl-4-(4-methylphenylmethyl)imidazole are preferred for use as component (c2).

Component (c2) is added in an amount of preferably 1 to 50% by weight, more preferably 5 to 30% by weight in the polymeric composition of the present invention. The antirust performance is dependent on the concentration of rust preventive agent in the composition, but when the amount of component (c2) is less than 1% by weight, the anticipated antirust effect is not provided sufficiently. Also, when the amount of component (c2) exceeds 50% by weight, the antirust ability reaches saturation, which indicates that it is economically undesirable to add component (c2) in excess of 50% by weight.

In the composition of the present invention, an imidazolesilane compound can be contained as component (c3). It is possible to use as component (c3), for instance, the imidazolesilane compounds represented by the following formula (1), their acid and salt derivatives, and mixtures of two or more of them.

[Formula 3]

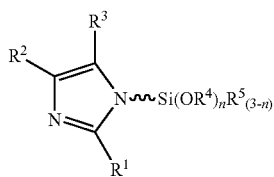

(1)

(wherein, for instance, $R^1$, $R^2$ and $R^3$ represent independently hydrogen, a vinyl group, a C1-C20 alkyl group, a benzyl group, a phenyl group, or a group derived therefrom; $R^2$ and $R^3$ may combine to form an aromatic ring; $R^4$ and $R^5$ represent independently a C1-C20 alkyl group; N—Si linkage represents an organic group; and n is a number of 0 to 3.)

Among the more specific examples of the imidazolesilane compounds represented by the above formula (1) are those represented by the following formulae (2), (3), (4), (5) and (6):

[Formula 4]

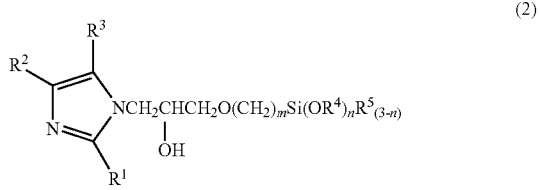

(2)

[Formula 5]

(3)

(In the above formulae (2) and (3), for example, $R^1$, $R^2$ and $R^3$ represent independently hydrogen, a vinyl group, a C1-C20 alkyl group, a benzyl group, a phenyl group or a group derived therefrom, and $R^2$ and $R^3$ may combine to form an aromatic ring; preferably $R^1$ represents hydrogen, a C1-C20 alkyl group, a benzyl group, a phenyl group or a group derived therefrom, and preferably $R^2$ represents hydrogen, a vinyl group, a C1-C5 alkyl group, a benzyl group, a phenyl group or a group derived therefrom; $R^4$ and $R^5$ represent independently a C1-C5, preferably C1-C3 alkyl group, etc.; m is a number of 0 to 10, preferably 3 for instance; and n is a number of 0 to 3 in the formula (2) and a number of 1 to 3 in the formula (3).)

[Formula 6]

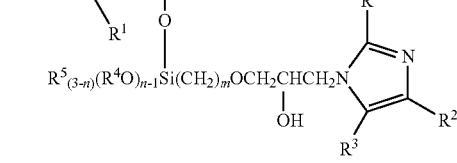

(4)

[Formula 7]

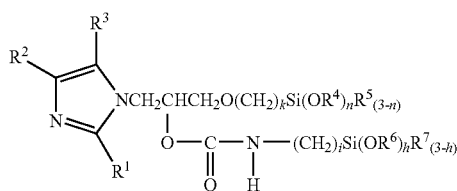

(5)

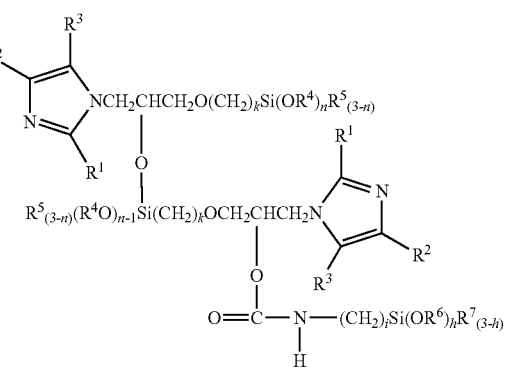

(In the above formulae (4) and (5), for instance $R^1$ represents hydrogen or a C1-C20 alkyl group; $R^2$ represents hydrogen, a vinyl group or a C1-C5 alkyl group; $R^3$ represents hydrogen, a vinyl group or a C1-C20 alkyl group, preferably hydrogen; $R^2$ and $R^3$ may combine to form an aromatic ring; $R^4$, $R^5$, $R^6$ and $R^7$ represent independently a C1-C3 alkyl group; h represents an integer of 1 to 3; l and k represent independently an integer of 1 to 5; and n represents a number of 0 to 3 in the formula (4) and a number of 1 to 3 in the formula (5).)

[Formula 8]

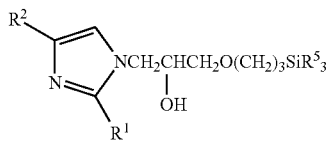

(6)

(In the formula (6), for instance, $R^1$ represents hydrogen or a C1-C20 alkyl group; $R^2$ represents hydrogen, a vinyl group or a C1-C5 alkyl group; and $R^5$ represents a C1-C5, preferably C1-C3 alkyl group.)

Among other candidate compounds to be used as component (c3) are the imidazolesilane compounds represented by the following formula (7), their acid and salt derivatives, and mixtures of two or more of these compounds.

[Formula 9]

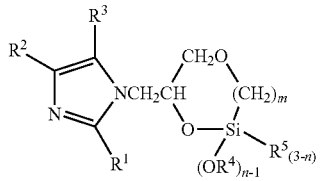

(7)

(In the formula (7), for instance, $R^1$, $R^2$ and $R^3$ represent independently hydrogen, a vinyl group, a C1-C20 alkyl group, a benzyl group, a phenyl group or a group derived thereform; $R^2$ and $R^3$ may combine to form an aromatic ring; preferably $R^1$ represents hydrogen, a C1-C20 alkyl group, a benzyl group, a phenyl group or a group derived therefrom, preferably $R^2$ represents hydrogen, a vinyl group, a C1-C5 alkyl group, a benzyl group, a phenyl group or a group derived therefrom, and preferably $R^3$ represents hydrogen; $R^4$ and $R^5$ represent independently a C1-C5, preferably C1-C3 alkyl group; m is a number of 1 to 10, preferably 3; and n is a number of 1 to 3.)

The imidazolesilane compounds of component (c3) represented by the above-shown formulae (2), (3), (6) and (7) can be prepared, for instance, by reacting specific imidazole compounds with specific glycidoxysilane compounds. Such specific imidazole compounds are not particularly defined, but their examples include imidazole, 2-substituted imidazole, 4-substituted imidazole, 5-substituted imidazole, 2,4-substituted diimidazole, 4,5-substituted diimidazole, 4,5-substituted diimidazole, and 2,4,5-substituted triimidazole. Among them, imidazole, 2-alkylimidazole, 2,4-dialkylimidazole and 4-vinylimidazole can be cited as typical compounds. The preferred examples thereof are imidazole; 2-alkylimidazoles such as 2-methylimidazole, 2-ethylimidazole, 2-propylimidazole, 2-butylimidazole, 2-undecylimidazole, and 2-heptadecylimidazole; 2,4-dialkylimidazoles such as 2,4-dimethylimidazole, 2-methyl-4-ethylimidazole, 2-methyl-4-propylimidazole, 2-methyl-4-butylimidazole, 2-ethyl-4-methylimidazole, 2,4-diethylimidazole, 2-ethyl-4-propylimidazole, 2-ethyl-4-butylimidazole, 2-propyl-4-methylimidazole, 2-propyl-4-ethylimidazole, 2,4-dipropylimidazole, 2-propyl-4-butylimidazole, 2-butyl-4-methylimidazole, 2-butyl-4-ethylimidazole, 2-butyl-4-propylimidazole, and 2,4-dibutylimidazole; and 4-vinylimidazole. The more preferred examples are imidazole, 2-methylimidazole, 2-ethylimidazole, 2-undecylimidazole, 2-heptadecylimidazole, 2-ethyl-4-methylimidazole, and 4-vinylimidazole. Examples of 2,4-substituted diimidazoles and 2,4,5-substituted triimidazoles include 2-methyl-4,5-dibenzylimidazole, 2-methyl-4-(4-chlorophenylmethyl)imidazole, and 2-phenyl-4-(4-methylphenylmethylimidazole.

The above-mentioned specific glycidoxysilane compounds that can be reacted with the specific imidazole compounds to prepare the imidazolesilane compounds of component (c3) are not specifically defined. Such glycidoxysilane compounds include, for instance, 3-glycidoxyalkyltrialkoxysilanes, 3-glycidoxyalkyldialkoxyalkylsilanes, 3-glycidoxyalkylalkoxydialkylsilanes, and 3-glycidoxyalkyltrialkylsilanes. Preferred among these compounds are 3-glycidoxypropyltrialkoxysilanes such as 3-glycidoxypropyltrimethoxysilane and 3-glycidoxypropyltriethoxysilane; 3-glycidoxypropyldialkoxyalkylsilanes such as 3-glycidoxypropyldimethoxymethylsilane; 3-glycidoxypropylalkoxydialkylsilanes such as 3-glycidoxypropylethoxydimethylsilane; and 3-glycidoxypropyltrialkylsilanes such as 3-glycidoxypropyltrimethylsilane, 3-glycidoxypropyltriethylsilane and 3-glycidoxypropyltripropylsilane.

The imidazolesilane compounds of component (c3) represented by the above-shown formulae (4) and (5) can be produced by reacting specific imidazole compounds, specific glycidoxysilane compounds and specific isocyanatosilane compounds. Examples of such specific imidazole compounds and specific glycidoxysilane compounds can be the same as those mentioned above. Examples of the specific isocyanatosilane compounds include isocyanatoalkyldialkoxyalkylsilanes, isocyanatoalkylalkoxydialkylsilanes, isocyanatoalkyltrialkoxysilanes, and isocyanatoalkyltrialkylsilanes. Preferred among these compounds are, for instance, isocyanatopropyldialkoxyalkylsilanes such as 3-isocyanatopropyltriethoxysilane; isocyanatopropylalkoxydialkylsilanes; isocyanatopropyltrialkoxysilanes; and isocyanatopropyltrialkylsilanes.

N-{3-(triethoxysilyl)propyl}-4,5-dihydroimidazole and the like can be also cited as a candidate compound to be used as component (c3).

As the acid and salt derivatives of the imidazolesilane compounds represented, for instance, by the formula (1) or the formula (7) of component (c3), the organic or inorganic acid derivatives can be cited as examples, and carboxylic acids can be named as examples of the organic acids.

The component (c3) is contained in an amount of preferably 3 to 50% by weight, more preferably 5 to 20% by weight in the polymeric composition of the present invention. The antirust ability of the composition depends on the concentration of the rust preventive agent in the composition, but when the content of component (c3) is less than 1% by weight, it may be found difficult to produce the intended antirust effect. Also, addition of component (c3) in excess of 50% by weight is unfavorable economically as the antirust ability reaches saturation.

The present invention is also capable of providing a metallic surface treating method which comprises cleaning a metallic surface with an acidic aqueous solution containing a water-soluble aminesulfonic polymer, and coating the cleaned metallic surface with a polymeric composition containing the above-described component (c2) and/or component (c3).

This metallic surface treating method is a rustproofing treatment which comprises a rustproofing pretreatment step in which the metallic surface to be treated is cleaned with an acidic aqueous solution containing a water-soluble aminesulfonic polymer, and an essential rustproofing treatment step in which the cleaned metallic surface is coated with the above-described polymeric composition.

The metals usable for the above-described metallic surface treating method include, for instance, iron and its alloys such as cast iron, carbon steel and stainless steel; copper and its alloys such as brass and cupronickel; zinc and its alloys; aluminum and its alloys; magnesium and its alloys; nickel and its alloys; chromium and its alloys; and the metal products comprising these metals.

As a water-soluble aminesulfonic polymer used for the above metallic surface treating method, there can be cited at least one compound selected from polyaminesulfone, diallylamine carbonate-sulfur dioxide copolymer, diallylamine acetate-sulfur dioxide copolymer, and diallyldimethylammonium chloride-maleic acid-sulfur dioxide terpolymer.

The physical and chemical properties, such as molecular weight and monomeric composition, of these water-soluble aminesulfonic polymers are not defined; for instance, the weight-average molecular weight of these polymers may range from 2,000 to 100,000.

The means for preparing an acidic aqueous solution containing a water-soluble aminesulfonic polymer is also not specifically defined. Such a solution can be prepared, for instance, by dissolving a water-soluble aminesulfonic polymer in water or an acid such as hydrochloric acid, sulfuric acid or a mixed acid. The concentration of the water-soluble aminesulfonic polymer in the acidic aqueous solution is not restricted, but, for instance, it is preferably 1 to 50% by weight, more preferably 1 to 10% by weight. When the concentration of the water-soluble aminesulfonic polymer in the acidic aqueous solution is less than 1% by weight, it may prove difficult to produce the desired rustproofing effect for the metallic surface. A polymer concentration in the above solution exceeding 50% by weight is disadvantageous in terms of economy.

The means for cleaning the metallic surface with an acidic aqueous solution in the above treating method is not defined, but it is possible to use, for instance, a method in which a foil, plate or product part made of a specific metal is immersed in or sprayed with an acidic aqueous solution. This metallic surface cleaning step (acid cleaning step) can remove scale or oxide layer on the metallic surface to activate the surface. Also, by this step, the amino groups and sulfur dioxide in the water-soluble aminesulfonic polymer are caused to deposit on the micro-polarized metallic surface to form a corrosion preventive film on the metallic surface, which contributes to inhibiting acidic corrosion.

The step of coating a polymeric composition of the present invention on the metallic surface cleaned by the above-described metallic surface cleaning step (acid cleaning step) in the above treating process is a step for rustproofing treatment and its means is not defined, but it is possible, for instance, to employ a method in which the metallic surface is coated with the polymeric composition by spraying or brushing, or immersed in a liquid of the polymeric composition or its solution. The coating temperature is not restricted, but, for instance, a temperature of from room temperature to 100° C. may be employed for coating. Coating may be followed by drying. The drying temperature is not defined, but, for instance, room temperature to 200° C. may be called an appropriate temperature for drying. The drying time is also not defined, but as a criterion of drying time, the fact is to be noted that drying may be completed in a short time, such as several minutes to several ten minutes, in case drying is performed till the rustproofing film becomes tack-free. Coating thickness is also not specified, but it is possible, for instance, to form a coat with a thickness of several μm to several ten μm by carrying out the coating operation by changing the concentration of the polymeric composition, and it is possible with this range of coating thickness to derive the desired coating function and performance.

Further, by coating the metallic surface cleaned by an acidic solution containing a water-solution aminesulfonic polymer (viz. the metallic surface subjected to an activating treatment in the pre-rustproofing treatment step) with the polymeric composition containing component (c2) and/or component (c3), it is possible to provide a pencil hardness of the 9H level, a 260° C. solder heat resistance due to the action of an amino group, sulfur dioxide, a functional ester group, SiO bond, or BO bond etc., and an oxidation resistance to a temperature of up to 200° C., and this has also made it possible to enhance adhesion to decorating coating after the rustproofing treatment. In the matter of performance, this coating can well compare with the chromate treatment in surface hardness, adhesion to metals and corrosion resistance, so that it is possible with this surface coating to supersede the chromate treatment.

Further, by containing component (c2) and/or component (c3), it is possible to obtain a polymeric composition having high weather resistance, excellent optical properties (such as transparency) as well as excellent hardcoating and antirust properties without requiring the complicate steps such as hydrolysis needed in the sol-gel method. Also, the polymeric composition or antirust coating composition containing component (c2) and/or component (c3) can be applied to glass, ceramics, metals, plastics, etc.

The above-described metal surface treating method makes it possible to satisfy both of the requirements for providing surface activation and corrosion resistance in the pre-rustproofing treatment step which comprises cleaning the metallic surface with an acidic solution prepared by blending a water-soluble aminesulfonic polymer with an acid corrosion inhibitor, and is also capable of producing the effects of providing improvement of heat resistance and oxidation resistance by the action of a borosilicate matrix in the above-described polymeric composition, improvement of pencil hardness of the coating film surface, improvement of corrosion resistance due to the antirust ability modified and integrated with the nitrogen heterocyclic compound of component (c2) and/or the imidazolesilane compound of component (c3), improvement of adhesion between the antirust coating and metals by the action of amino groups or sulfur dioxide groups, and improvement of adhesion between the functional groups of the antirust coating film and the coating material. Therefore, this metallic surface treatment exhibits excellent functions and capabilities in deriving, for instance, improvement of surface hardness and corrosion resistance of magnesium and its alloys, improvement of surface hardness, solder heat resistance and oxidation resistance of copper and its alloys, and improvement of wear resistance of the metallic products having decorative coating. Also, since the metallic surface treating method using the polymeric composition of the present invention with such improved functions and capabilities can be equal to the chromate treatment in functions and capabilities, this method has practically the industrial advantage in that it can offer a substitute for the chromate treatment from the standpoint of environmental protection.

The polymeric composition of the present invention can further contain a conductivity imparting agent (conductive material) (component (c4)) in place of or in addition to the components (c1) to (c3) described above.

The polymeric composition of the present invention is given conductivity by the incorporation of component (c4).

Component (c4) can be at least one substance selected from the group consisting of carbon nanotube and polymeric organic semiconductors.

The carbon nanotube of component (c4) is expected to be valued as a novel material which has high strength, good electrical and thermal conductivity, and excellent sliding characteristics, and it constitutes an important part of the present invention.

Carbon nanotube (hereinafter referred to as "CNT") of component (c4) is a general term for the materials having a 6-membered ring network structure (graphene sheet) composed of carbon with a single-layered or multilayered coaxial tubular shape. The single-layered one is called single wall nanotube (SWNT), and the multilayered one is called multi-wall nanotube (MWNT). Particularly, the two-layered one is called double wall nanotube (DWNT).

Various types of CNT can be used, but it is preferable for blending convenience to use CNT dispersed in an alcohol at the molecular level. Single wall nanotube (SWNT) is the most preferred for maintaining intrinsic properties such as conductivity and transparency of the material.

CNT used in the present invention is not specifically defined regarding the arrangement of its 6-membered rings, the ratios of the 5-membered or 7-membered rings in the network, diameter, length and molecular weight, but for instance the one having a diameter of 0.4 to 10 nm and a length of 10 to 1,000 nm is preferably used.

The amount of CNT to be incorporated is not defined; it suffices to incorporate CTN in an amount capable of providing required conductivity (antistatic performance) to the polymeric composition. To be specific, CNT may be added in an amount of preferably 1 to 10 parts by weight, more preferably 2 to 7 parts by weight, per 100 parts by weight of the other components excluding component (c4), in the above-described polymeric composition.

The polymeric organic semiconductor of component (c4) is also called a conductive polymer. The conventional polymeric materials are of the nature that does not allow passage of electricity, but recently various types of polymeric organic semiconductors have been developed from the studies of polyacetylene properties, and their practical applications have come to be discussed in earnest. Many of the conventional polymeric organic semiconductors were insoluble in the solvents, but recently some types of polymeric organic semiconductors soluble in various types of solvents have been developed. Also, conductive performance of the polymeric organic semiconductors has been improved remarkably, and their field of utilization is expanding centering around the electronic parts.

The polymeric organic semiconductor, viz. conductive polymer, used as component (c4) is not specifically defined, but preferably it is at least one polymer selected from the group consisting of polyaniline, polyparaphenyline, polyparaphenylenevinylene, polyimidazole, polybenzoimidazole, polythiophene, polybenzothiophene, polyacetylene, polypyrrole and other polymers obtained by introducing substituent groups into the skeletons of the above polymers, or a mixture and/or copolymer of any two or more of these polymers.

When the polymeric organic semiconductor of component (c4) is polyacetylene, the conjugated double bonds tend to become vulnerable to air oxidation to make the composition labile, so that use of polyacetylene is not particularly preferable in the present invention.

The more preferred examples of polymeric organic semiconductors usable as component (c4) are polythiophene, polyaniline, polypyrrole, their derivatives and the dopant-introduced versions of these polymers. These polymers may be used singly. The especially preferred examples of polymeric organic semiconductors usable as component (c4) are polyaniline and/or a polymer obtained by having a dopant introduced into its conductor.

The dopants usable in the present invention are not specifically defined, but it is preferable to use protonic acid dopants, which include inorganic acids such as hydrochloric acid, sulfuric acid, nitric acid and perchloric acid; organic acids such as benzenesulfonic acid, P-toluenesulfonic acid, m-nitrobenzoic acid and trichloroacetic acid; and polymeric acids such as polystyrenesulfonic acid and polyvinylsulfuric acid. These dopants may be used singly or in the form of a mixture of any two or more thereof. The amount of dopant used is not defined, but doping of 1 to 50% is preferred.

The amount of the polymeric organic semiconductor, viz. conductive polymer, used as component (c4) is not specifically defined, but in order to provide the product with transparency, hardcoating properties and particularly conductivity in the antistatic region, a polymeric organic semiconductor is added in an amount of preferably 1 to 10 parts by weight, more preferably 2 to 7 parts by weight, per 100 parts by weight of the components other than component (c4) in the polymeric composition. When it is desired to provide even better conductivity while compromising transparency, a polymeric organic semiconductor is added in an amount of preferably 10 to 70 parts by weight, more preferably 15 to 50 parts by weight, per 100 parts by weight of the components excluding component (c4) in the polymeric composition.

By containing component (c4), it is possible to obtain a polymeric composition having high heat resistance, excellent optical properties such as transparency, hardcoating properties and conductivity without necessitating the complicate steps such as hydrolysis required in a sol-gel method. The polymeric composition containing component (c4), when used as a coating agent, can afford high functions to the resin products by applying the coating agent on at least one side of resin films, sheets and resin molded products. The composition can be also utilized for forming a corrosion preventive film.

The polymeric composition of the present invention can further contain a photocatalytic function imparting agent (photocatalytic material) (component (c5)) in place of or in addition to the above-described components (c1) to (c4).

By incorporating component (c5), it is possible to impart a photocatalytic function to the polymeric composition of the present invention.

Oxide semiconductors having a photocatalytic activity can be exemplified as component (c5).

Titanium dioxide (anatase) was first developed as an oxide semiconductor having a high photocatalytic activity, and its high photocatalytic activity particularly in the ultraviolet region has been confirmed.

Titanium dioxide is a typical oxide semiconductor, which, on receiving light energy, is per se brought into an energy-loaded state to release electrons from the surface exposed to light, thus exhibiting a photocatalytic function.

Recently, there have been developed the oxide semiconductors and nitride semiconductors which show a high photocatalytic activity on exposure to visible light, and the scope of utilization of photocatalysts is expanding.

The type of the oxide semiconductors having a photocatalytic activity usable as component (c5) is not specifically defined, but those of the oxide semiconductors (photocatalysts) which can induce a photocatalytic function on exposure to visible light with a wavelength of 380 nm or above may be cited as preferable examples. Thus, the oxide semiconductor having a photocatalytic activity used as component (c5) is preferably a visible light responsive type photocatalyst.

Also, the oxide semiconductors usable as component (c5) may be those of which part of the corpuscle surfaces are coated with a protective material which is inert to the above-described photocatalytic function, or those which are partly substituted with nitrogen atoms and/or sulfur atoms.

Examples of the corpuscular oxide semiconductors that can derive a photocatalytic function on exposure to visible light with a wavelength of 380 nm or above include $Fe_2O_3$, $Cu_2O$, $In_2O_3$, $WO_3$, $Fe_2TiO_3$, PbO, $V_2O_5$, $FeTiO_3$, $Bi_2O_3$, $Nb_2O_3$, $SrTiO_3$, ZnO, $BaTiO_3$, $CaTiO_3$, $KTaO_3$, $SnO_2$ and $ZrO_2$. Those oxide semiconductors are preferably corpuscular.

The modified versions of these oxide semiconductors, viz. those obtained by subjecting the conductive oxides such as titanium oxide, tin oxide, zinc oxide, strontium titanate, tungsten oxide, zirconium oxide, niobium oxide, iron oxide, copper oxide, iron titanate, nickel oxide and bismuth oxide to a modification treatment so as to be able to develop a photocatalytic function on exposure to visible light, are also usable as component (c5).

These oxide semiconductors can be produced by the methods such as disclosed in JP-A-2004-143032 and JP-A-2001-212457.

The form of the oxide semiconductor used as component (c5) is not defined; it may be, for instance, a powder, an organic solvent sol formed by dispersing the semiconductor in a polar solvent such as an alcohol, or a colloid.

In case the oxide semiconductor of component (c5) is in a form of sol or colloidal, its solid concentration in the composition is preferably 40% by weight or less. The primary particle size of such an oxide semiconductor is preferably 200 nm or less, especially 100 nm or less. When the primary particle size exceeds 200 nm, the produced composition may be low in transparency and its haze may exceed 2.

An oxide semiconductor is added as component (c5) in an amount of preferably 1 to 90% by weight, more preferably 3 to 50% by weight, even more preferably 5 to 30% by weight, based on the nonvolatile components of the composition (the components which are not volatilized by 30-minute heating at 105° C.), in the polymeric composition. When the amount of the oxide semiconductor used as component (c5) is less than 1% by weight, the produced composition may fail to show a photocatalytic action on exposure to visible light. When the amount of the oxide semiconductor added exceeds 90% by weight, there may take place choking when a coating film is formed, causing deterioration of the film forming properties.

Thus, by incorporating component (c5), there can be obtained a polymeric composition having high weather resistance, excellent optical properties (such as transparency) and excellent hardcoating properties, and also having a photocatalytic activity, without necessitating the complicate steps such as hydrolysis which are required in a sol-gel method. The polymeric composition containing component (c5) (photocatalytic coating composition) can be applied to glass, ceramic, metallic and plastic products.

The polymeric composition of the present invention is fast-drying and its granules can be sphered by spraying. In use of the composition for coating, it is possible to add various types of solvents such as alcohols, esters and ethers as well as surfactants. The polymeric composition of the present invention, therefore, finds its uses such as listed below in addition to the applications mentioned above:

- Hard coating and protective coating for sporting goods such as fishing tackle, golf and baseball equipments, etc.
- Waxes for surface protection of resins, metals, wood, glass, etc.
- Prime coat for waxing
- Mildewproofing, antibacterial and algae control agents using silver ions or copper ions
- Water-repellant, hydrophilic and defrosting coatings making use of a porous coating film
- Antirust coating using zinc flakes
- Water-repellent coating using powder subjected to a water-repellent treatment or a water repellant
- Heat-resistant coating with aluminum powder added
- Hydrophilicizing agent with a surfactant added
- Fade preventive agent for ink-printed or coated articles
- Sag preventive agent using surface-hydrophilicized silica
- Fluorescent coating with fluorescent agent or light accumulating agent added
- Abrasive impregnated in fabrics or non-woven fabrics
- Surface mending agent for stone, concrete, ceramics, etc.
- Insulation protective film
- Impregnation reforming agent for resin and rubber products
- Fluorescent reagents for bioassays
- Matting agent and fingerprint preventive agent having added therein a filler such as acrylic or silica filler with a granular size of 20 μm or less
- Matting agent and fingerprint preventive agent having their granules sphered by spraying, and inorganic fillers
- Coating material for bake coating

EXAMPLES

The present invention will be explained by showing the embodiments thereof.

The test samples were prepared by mixing the components in the molar ratios or weight ratios shown in Tables 1 to 3 for the respective Examples. An organosilane compound (component (a)) was reacted sufficiently with a boron compound (component (b)), and then the other components (such as component (d)) were added.

It was found that the greater the amount of the boron compound added, the higher the viscosity of the preparation before solidification, and when the amount of the boron compound is reduced, the viscosity of the preparation becomes lower correspondingly, making it hard to carry out molding of the preparation.

Example 1

To 221 g (1 mol) of γ-aminopropyltriethoxysilane was added 61.8 g (1 mol) of $H_3BO_3$ powder, and the mixture was stirred for 5 minutes. Then a pentamer of Ethyl Silicate 40 (produced by COLCOAT CO., LTD.) (viz. a pentamer of tetraethoxysilane (TEOS)) was added as component (d) in an amount of 820 g (5.5 mol calculated in terms of weight of TEOS monomer), and the mixture was further stirred for 5 minutes and then allowed to stand to prepare a test sample. The molecular weight of TEOS was 208, and the average molecular weight of the component (d) (pentamer of TEOS) used was 745.

Example 2

A test sample was prepared in the same way as in Example 1 except that component (d) was added in an amount of 11 mol calculated in terms of weight of TEOS monomer.

Example 3

A test sample was prepared in the same way as in Example 1 except that component (d) was added in an amount of 16.7 mol calculated in terms of weight of TEOS monomer.

Example 4

A test sample was prepared in the same way as in Example 1 except that component (d) was added in an amount of 22 mol calculated in terms of weight of TEOS monomer.

Example 5

A test sample was prepared in the same way as in Example 1 except that component (5) was added in an amount of 33.2 mol calculated in terms of weight of TEOS monomer. The results show that the aimed effect of the present invention can well be obtained even when component (d) is used in an amount of 30 mol or more calculated in terms of weight of TEOS monomer.

Comparative Example 1

A test sample was prepared in the same way as in Example 1 except that component (d) was not used, and that the TEOS monomer was used in an amount of 2,500 g (12 mol). The obtained hardened product had a white color, lacked transparency, and was in a phase-separated state, and it was impossible to obtain a film which was dense and had a desired hardness.

Comparative Example 2

A test sample was prepared in the same way as in Example 1 except that component (d) was not used, and that the TEOS monomer was used in an amount of 3,333 g (16 mol). The obtained hardened product had a white color and lacked transparency.

Comparative Example 3

A test sample was prepared in the same way as in Example 1 except that component (d) was not used, and that the TEOS monomer was used in an amount of 5,000 g (24 mol). The obtained hardened product had a white color and lacked transparency.

Evaluation Methods
<Rigidity>

Each test sample was coated on a mild steel plate and heated at 120° C. for one hour, and the hardness of the coat was measured and shown by pencil hardness (according to JIS K5400 08.4, 2).

<Appearance of the Hardened Products>

Color, etc., of the obtained hardened products were visually judged.

Examples 6 to 11

To 221 g (1 mol) of γ-aminopropyltriethoxysilane was added 61.4 g (0.8 mol) of $H_3BO_3$ powder, and the mixture was stirred for 5 minutes. Then a pentamer of Ethyl Silicate 40 (produced by COLCOAT CO., LTD.) was added as component (d) in an amount of 745 g (5.0 mol calculated in terms of weight of TEOS monomer), and the mixture was further stirred for 5 minutes and then allowed to stand to prepare a test sample. To 19 parts by weight of the resultant solution was added an epoxy resin (tradename "DetaNite CY-2321" produced by Nagase Chemtec Co., Ltd.) (Examples 6 to 8) or dipentaerythritol hexaacrylate (produced by Nagase Chemtec Co., Ltd.) (Examples 9 to 11) in an amount of 1 part by weight, 2 parts by weight and 3 parts by weight for the respective Examples as shown in Table 2. The resultant mixtures were stirred and hardened, and the pencil hardness of the products was measured.

Comparative Examples 4 and 5

In Comparative Example 4, 30 parts by weight of a curing agent (tradename "HY956" produced by Nagase Chemtec Co., Ltd.) was mixed with 100 parts by weight of an epoxy resin (tradename "DetaNite CY-232" produced by Nagase Chemtec Co., Ltd.), and the mixture was cured at 110° C. for one hour.

In Comparative Example 5, 3 parts by weight of an ultraviolet curing agent (Irgacure 184 produced by Ciba Speciality Chemicals Co., Ltd.) was mixed with 100 parts by weight of dipentaerythritol hexaacrylate, and the mixture was cured by irradiation with ultraviolet light. Pencil hardness of the obtained products was measured.

As is apparent from Table 2, there was admitted an improvement of rigidity (pencil hardness) with the polymeric compositions of the present invention over the resins using a curing agent alone (Comparative Examples 4 and 5) as component (e).

TABLE 1

|  | Ex. 1 | Ex. 2 | Ex. 3 | Ex. 4 | Ex. 5 | Comp. EX. 1 | Comp. EX. 2 | Comp. EX. 3 |
| --- | --- | --- | --- | --- | --- | --- | --- | --- |
| (b) component Boron compound: $H_3BO_3$ | 1 mol | 1 mol | 1 mol | 1 mol | 1 mol | 1 mol | 1 mol | 1 mol |
| (a) component Aminosilane compound: $(C_2H_5O)_3SiC_3H_6NH_2$ | 1 mol | 1 mol | 1 mol | 1 mol | 1 mol | 1 mol | 1 mol | 1 mol |
| (d) component TEOS: $Si(OC_2H_5)_4$ pentamer Converted to weight of monomer | 5.5 mol | 11 mol | 16.7 mol | 22 mol | 33.2 mol | TEOS monomer, 12 mol | TEOS monomer, 16 mol | TEOS monomer, 24 mol |
| Hardened product | Transparent | Transparent | Transparent | Transparent | Transparent | White | White | White |
| Pencil hardness | 8H | 6H | 6H | 4H | 4H | 6H | 6H | 4H |

TABLE 2

| | Ex. 6 | Ex. 7 | Ex. 8 | Ex. 9 | Ex. 10 | Ex. 11 | Comp. Ex. 4 | Comp. Ex. 5 |
|---|---|---|---|---|---|---|---|---|
| Prepared solution | 19 parts by weight (a):(b):(d) = 1:0.8:5 mol (a) component: γ-aminopropyltriethoxysilane (b) component: H₃BO₃ powder (c) component: Ethyl silicate 40 pentamer (produced by COLCOAT CO., LTD.) | | | | | | | |
| Epoxy resin DetaNite CY-232 | 1 part by weight | 2 parts by weight | 3 parts by weight | | | | Resin + curing agent | |
| Dipenta-erithritol hexaacrylate | | | | 1 part by weight | 2 parts by weight | 3 parts by weight | | Resin + UV curing agent |
| Pencil hardness | 6H | 6H | 6H | 8H | 8H | 6H | 2H | 6H |

INDUSTRIAL APPLICABILITY

The polymeric composition of the present invention can be used as a coating agent or an adhesive. It is possible to obtain a functional material by applying the composition on an inorganic or organic base material, and to obtain a glass base material by applying the composition on a glass cloth.

The invention claimed is:

1. A polymeric composition comprising:
a reaction product (c) obtained by reacting (a) an organosilane compound represented by the following formula:

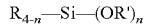

wherein R represents an organic group containing an amino group; R' represents a methyl group, an ethyl group or a propyl group; and n is an integer selected from 1 to 3; with (b) at least one boron compound selected from the group consisting of $H_3BO_3$ and $B_2O_3$,
wherein the organosilane compound of component (a) is at least one organosilane compound selected from the group consisting of γ-aminopropyltriethoxysilane and N-β-(aminoethyl)-γ-aminopropyltrimethoxysilane,
wherein the components (a) and (b) are reacted in a molar ratio of (a):(b) of 1:0.02 to 8; and
(d) a condensation product of a metal alkoxide represented by the following formula (d1):

(d1)

wherein $R^1$ represents independently an alkyl group, part of which may be hydrogen, and $R^1$ may be identical to or different from each other; m is an integer selected from 2 to 20; and M represents at least one metal selected from the group consisting of Si, Ti and Zr, wherein the metal alkoxide condensation product (d) is a condensation product of tetraethoxysilane or tetramethoxysilane,
wherein the condensation product of a metal alkoxide (d) is contained in an amount of 4 to 50 mol, calculated in terms of weight of the metal alkoxide monomer, per mol of component (a).

2. A polymeric composition according to claim 1 wherein the boron compound (b) is an alcohol solution of a boron compound prepared by dissolving the boron compound in an alcohol with a carbon number of 1 to 7.

3. A polymeric composition according to claim 1 wherein the boron compound of component (b) is $H_3BO_3$.

4. A polymeric composition according to claim 1 wherein the reaction product (c) is a reaction product obtained by reacting the component (a) with the component (b) without going through a step of hydrolysis in which water is added.

5. A polymeric composition according to claim 1, further containing a synthetic resin (e).

6. A polymeric composition according to claim 1 wherein the polymeric composition is fibrous.

7. A polymeric composition according to claim 1 wherein the polymeric composition is granular.

8. A base material obtained by calcining the polymeric composition of claim 1 at a temperature of 1,000° C. or below.

9. A coating agent containing, as a main component thereof, the polymeric composition set forth in claim 1.

10. An adhesive containing, as a main component thereof, the polymeric composition set forth in claim 1.

11. A functional material obtained by coating an inorganic or organic base material with the polymeric composition set forth in claim 1.

12. A glass base material obtained by calcining the functional material of claim 11 at a temperature of 1,000° C. or below, wherein the inorganic or organic base material is a glass cloth.

13. A functional material obtained by coating an inorganic or organic base material with the coating agent set forth in claim 9.

14. A glass base material obtained by calcining the functional material of claim 13 at a temperature of 1,000° C. or below, wherein the inorganic or organic base material is a glass cloth.

15. A functional material obtained by coating an inorganic or organic base material with the adhesive set forth in claim 10.

* * * * *